United States Patent
Duenyas

(10) Patent No.: US 8,867,541 B2
(45) Date of Patent: Oct. 21, 2014

(54) METHOD FOR COMMUNICATION IN A WIRELESS NETWORK COMPRISING A LOCAL AREA NETWORK

(75) Inventor: Izhak Duenyas, Rehovot (IL)

(73) Assignee: Sparkmotion Inc., Ottawa, Ontario (CA)

( * ) Notice: Subject to any disclaimer, the term of this patent is extended or adjusted under 35 U.S.C. 154(b) by 931 days.

(21) Appl. No.: 12/636,954

(22) Filed: Dec. 14, 2009

(65) Prior Publication Data

US 2010/0150124 A1 Jun. 17, 2010

(30) Foreign Application Priority Data

Dec. 14, 2008 (IL) .......................................... 195918

(51) Int. Cl.
| | | |
|---|---|---|
| *H04L 12/28* | (2006.01) | |
| *H04L 12/56* | (2006.01) | |
| *H04J 3/24* | (2006.01) | |
| *H04L 12/46* | (2006.01) | |
| *H04L 12/801* | (2013.01) | |
| *H04L 12/851* | (2013.01) | |
| *H04L 12/725* | (2013.01) | |
| *H04L 12/721* | (2013.01) | |

(52) U.S. Cl.
CPC ........ *H04L 12/4666* (2013.01); *H04L 12/4633* (2013.01); *H04L 47/14* (2013.01); *H04L 47/2441* (2013.01); *H04L 45/302* (2013.01); *H04L 45/66* (2013.01); *H04L 47/2408* (2013.01)
USPC ........................ 370/392; 370/395.54; 370/474

(58) Field of Classification Search
None
See application file for complete search history.

(56) References Cited

U.S. PATENT DOCUMENTS

| | | | | |
|---|---|---|---|---|
| 2004/0202171 | A1* | 10/2004 | Hama ........................ | 370/395.1 |
| 2005/0174935 | A1* | 8/2005 | Segel ............................ | 370/228 |
| 2006/0092963 | A1* | 5/2006 | Bakre et al. ................... | 370/437 |
| 2006/0160533 | A1* | 7/2006 | Chou et al. ................ | 455/422.1 |
| 2006/0184694 | A1* | 8/2006 | Monette et al. .............. | 709/246 |
| 2006/0184695 | A1* | 8/2006 | Monette et al. .............. | 709/246 |
| 2007/0104215 | A1* | 5/2007 | Wang et al. .................... | 370/458 |
| 2008/0014955 | A1* | 1/2008 | Shannon et al. ........... | 455/452.1 |
| 2008/0117910 | A1* | 5/2008 | Page ............................. | 370/392 |
| 2008/0137567 | A1* | 6/2008 | Fang ............................. | 370/310 |
| 2008/0155252 | A1* | 6/2008 | Nambiar ....................... | 713/153 |
| 2008/0178266 | A1* | 7/2008 | Touray et al. ..................... | 726/4 |
| 2008/0192769 | A1* | 8/2008 | Tischer et al. ................ | 370/466 |
| 2008/0205377 | A1* | 8/2008 | Chao et al. .................... | 370/351 |
| 2008/0205452 | A1* | 8/2008 | Chou ........................... | 370/493 |
| 2009/0034431 | A1* | 2/2009 | Nagarajan et al. ............ | 370/254 |
| 2009/0109985 | A1* | 4/2009 | Yazaki et al. ................. | 370/401 |
| 2009/0116505 | A1* | 5/2009 | Bhatia et al. .................. | 370/419 |
| 2009/0285176 | A1* | 11/2009 | Zheng et al. .................. | 370/331 |
| 2010/0290621 | A1* | 11/2010 | Muhanna et al. ............. | 380/270 |

* cited by examiner

*Primary Examiner* — Ashley Shivers
(74) *Attorney, Agent, or Firm* — Procopio, Cory, Hargreaves & Savitch LLP

(57) ABSTRACT

A method for use by a subscriber device associated with a LAN in a wireless network, to enable provisioning of services to another subscriber device associated with that LAN. The method includes (i) at the first subscriber device, receiving an outgoing packet generated by the other subscriber device associated, wherein that outgoing packet has been tagged with a VLAN label; (ii) forwarding the outgoing packet towards a source MAC address of the subscriber device; (iii) associating a DSCP value with the outgoing packet; (iv) removing VLAN label and Ethernet MAC layer from the outgoing packet and forwarding the remaining IP packet to a MAC convergence sub-layer; (v) at the MAC convergence sub-layer, forwarding the outgoing packet to a service flow determined by using a DSCP value associated with the outgoing packet; and forwarding the outgoing packet along an air-link service flow connection.

6 Claims, 4 Drawing Sheets

METHOD FOR COMMUNICATION IN A WIRELESS NETWORK COMPRISING A LOCAL AREA NETWORK

FIELD OF THE INVENTION

The present invention relates generally to digital wireless communications systems and methods of using them, and in particular, to methods for providing services in a wireless network operating in accordance with the IEEE WIMax Recommendation.

Legend

The following are the meanings of certain abbreviations used hereinafter in the description of the invention:
ARP—Address Resolution Protocol (protocol for finding a MAC address of a station/terminal based on its IP address)
ASN—Access Service Network
BS—Base Station
CPE—Customer Premises Equipment
CSN—Connectivity Service Network
DHCP—Dynamic Host Configuration Protocol
DSCP—Differentiated Services Code Point for differentiated services within communication networks. Six bits of the service byte have being allocated for use as the DSCP field, where each DSCP specifies a particular per-hop behavior that is applied to a packet.
GRE—Generic Routing Encapsulation is a tunneling protocol that can encapsulate a wide variety of network layer protocol packet types inside IP tunnels, creating a virtual point-to-point link to http://en.wikipedia.org/w/index.php?title=Cisco_router&action=edit&redlink=1 routers at remote points over an IP network.
GS—Guaranteed Service
GW—Gateway
IP—Internet Protocol
MAC—Media Access Control address
MSS—Mobile Subscriber Station (also used as mobile terminal)
NAS—Network Access Server
QoS—Quality of Service
VLAN—Virtual Local Area Network
VoIP—Voice over IP network
WiMAX—Worldwide Interoperability for Microwave Access

BACKGROUND OF THE INVENTION

WiMAX is a telecommunications technology that applies for wireless transmission of data using a variety of transmission modes, from point-to-point links to portable internet access. The technology provides up to 75 Mb/sec symmetric broadband speed without requiring the use of cables. The technology is based on the IEEE 802.16 standard, also called Broadband Wireless Access and is described as a standards-based technology enabling the delivery of last mile wireless broadband access as an alternative to cable and DSL.

In a fixed wireless configuration, the WiMAX can replace (or supplement) the telephone company's copper wire networks and the cable TV's coaxial cable infrastructure, while offering Internet Service Provider (ISP) services. In its mobile variant, WiMAX has the potential to replace cellular networks.

WiMAX provides fixed, portable or mobile non-line-of sight service from a base station to a subscriber station, also known as customer premise equipment (CPE). One of the goals that were set for WiMAX, is, a radius of service coverage of 6 miles from a WiMAX base station for point-to-multipoint, non-line-of-sight service. This service should deliver approximately 40 megabits per second (Mbps) for fixed and portable access applications. WiMAX cell site may offer from one base station enough bandwidth to support hundreds of businesses with T1 speeds and thousands of residential customers with the equivalent of DSL services.

Mobile WiMAX takes the fixed wireless application a step further and enables cell phone-like applications on a much larger scale. For example, mobile WiMAX enables streaming video to be broadcast from a speeding platform (e.g. a police or other emergency vehicle at over 70 MPH). In addition to being the final leg in a quadruple play, it offers superior building penetration and improved security measures over fixed WiMAX. Mobile WiMAX will be very valuable for emerging services such as mobile TV and gaming. In addition, the WiMAX may allow its subscribers to receive a broad range of information services through their CPEs such as Internet access, VoIP, IPTV, in a two-way or interactive service.

There are two typical scenarios for a wireless deployment, point-to-point and point-to-multipoint. Point to point is used where there are two points of interest: one sender and one receiver. This is also a scenario for backhaul or the transport from the data source (data center, co-lo facility, fiber POP, Central Office, etc) to the subscriber or for a point for distribution using point to multipoint architecture. Backhaul radios are an industry of their own within the wireless industry. As architecture calls for a highly focused beam between two points range and throughput of point-to point radios will be higher than that of point-to-multipoint products. In a point-to-multipoint configuration, one base station can service hundreds of dissimilar subscribers in terms of bandwidth and services offered.

GRE tunnels are designed to be completely stateless. This means that each tunnel end-point does not keep any information about the state or availability of the remote tunnel end-point. Consequently, the local tunnel end-point router does not have the ability to bring the line protocol of the GRE tunnel interface down if the remote end-point is unreachable. The ability to mark an interface as being down when the remote end of the link is not available, is used in order to remove any routes (specifically static routes) in the routing table that use that interface as the outbound interface. Specifically, if the line protocol for an interface is changed to "down" state, any static routes that point out that interface would be removed from the routing table. Normally, a GRE tunnel interface comes up as soon as it is configured and stays up as long as there is a valid tunnel source address or interface which is up. The tunnel destination IP address must also be routable. This is true even if the other side of the tunnel has not been configured. This means that a static route or PBR forwarding of packets via the GRE tunnel interface remains in effect even though the GRE tunnel packets do not reach the other end of the tunnel.

SUMMARY OF THE INVENTION

It is an object of the present invention to provide a method to enable transparent VLAN connectivity over an IPCS system that is otherwise unable to provide end to end VLAN connectivity.

It is yet another object of the present invention to provide a method that allows VLAN end to end transparency between the CPE LAN and the ASN GW northbound interface without passing through the VLAN.

It is another object of the present invention to provide a method to reduce the packet size by removing VLAN and MAC addresses there from. Thus, the method provided allows the reduction of approximately 30% of the packet's headers overhead when comparing Eth CS mode that allows VLAN and Eth MAC layer transfer over the air-link, thereby increasing the air-link capacity rather substantially and particularly in cases of small packets such as VoIP packets.

It is still another object of the present invention to provide a method that allows efficient provisioning of additional services.

Other objects of the present invention will become apparent as the description of the present invention proceeds.

According to a first embodiment of the invention there is provided a method for use by a first subscriber device associated with a local area network (LAN) comprised in a wireless network, where the wireless network is preferably operative in accordance with IEEE WiMAX Recommendation (802.16 and/or 802.16e). The method is provided to enable provisioning of services to at least one other subscriber device associated with that LAN, and comprises the steps of:

i) receiving by the first subscriber device at least one outgoing packet that has been generated by the at least one other subscriber device associated with the LAN with which the first subscriber device is associated, wherein that at least one packet has been tagged with a VLAN label;

ii) forwarding the at least one outgoing packet towards an address being a source MAC address of the first subscriber device;

iii) associating a DSCP value with each of the at least one outgoing packets;

iv) removing VLAN label and Ethernet MAC layer from the at least one outgoing packet and forwarding the remaining IP packet to a MAC convergence sub-layer;

v) at the convergence sub-layer, forwarding the at least one outgoing packet to a service flow determined by using a DSCP value associated with the at least one outgoing packet; and vi) forwarding the at least one outgoing packet along the an air-link service flow connection that corresponds to the respective DSCP that has been associated with each of the at least one outgoing packet.

The term DSCP value as used herein and throughout the specification and claims should be understood not be restricted to the DSCP protocol, but to encompass also any other layer 3, layer 4 or any higher layer classifier as applicable for carrying out the method provided by the present invention.

According to another preferred embodiment of the invention, the method provided further comprises a step of forwarding the at least one outgoing packet along a GRE tunnel and recovering information associated with the identification of the VLAN by using the GRE tunnel key.

In accordance with another aspect of the invention, there provided a method for use by a first subscriber device associated with a local area network (LAN) comprised in a wireless network which is preferably operative in accordance with IEEE WiMAX Recommendation. The method provided enables provisioning of services to at least one other subscriber device associated with that LAN and comprises the steps of:

receiving by the first subscriber device at least one incoming packet that has been generated outside the LAN, and preferably at the WiMAX Access system;

comparing a DSCP value associated with each of the at least one incoming packet and tagging same with the appropriate VLAN tag;

applying Address Resolution Protocol ("ARP") procedure to find a MAC address of a at least one other subscriber device associated with that LAN, based on the other subscriber device's IP address;

forwarding the at least one incoming packet towards its destination MAC address as found in the step of applying the ARP procedure. The MAC address identified in the ARP process would preferably be added to the packet if the latter arrives from the link without a MAC address as it has been conveyed along an IP CS media.

The term LAN as referred to herein throughout the specification and claims should be understood to preferably refer to a LAN connected on the WiMax Access system at its north bound interface.

According to an embodiment of this aspect of the invention, the method provided further comprises a step of identifying for the at least one incoming packet, a MAC address associated with a subscriber device (e.g. the first subscriber device), wherein the identification is made based on the VLAN label and the IP designation address of the respective at least one incoming packet.

Preferably, upon identifying the subscriber device with which that MAC address is associated, forwarding the respective at least one incoming packet to the corresponding GRE tunnel with which the subscriber device whose MAC address was identified, is associated.

More preferably, the forwarding of the respective at least one incoming packet to the corresponding GRE tunnel is carried out based upon the information retrieved from a DSCP classifier associated with the at least one incoming packet.

DETAILED DESCRIPTION OF THE INVENTION

A better understanding of the present invention may be obtained when the following non-limiting detailed description is considered in conjunction with the accompanying drawings.

As was previously explained, one of the main objects of the present invention is to enhance the networking services that may be provided by WiMax CPEs. The proposed solution allows simple implementation that allows VLAN end to end transparency between the CPE LAN and the ASN GW northbound interface without passing the VLAN. This solution provides a VPN connection using VLAN groups over IP CS standard WiMax access system that cannot be provided while using prior art systems.

Figure 1:
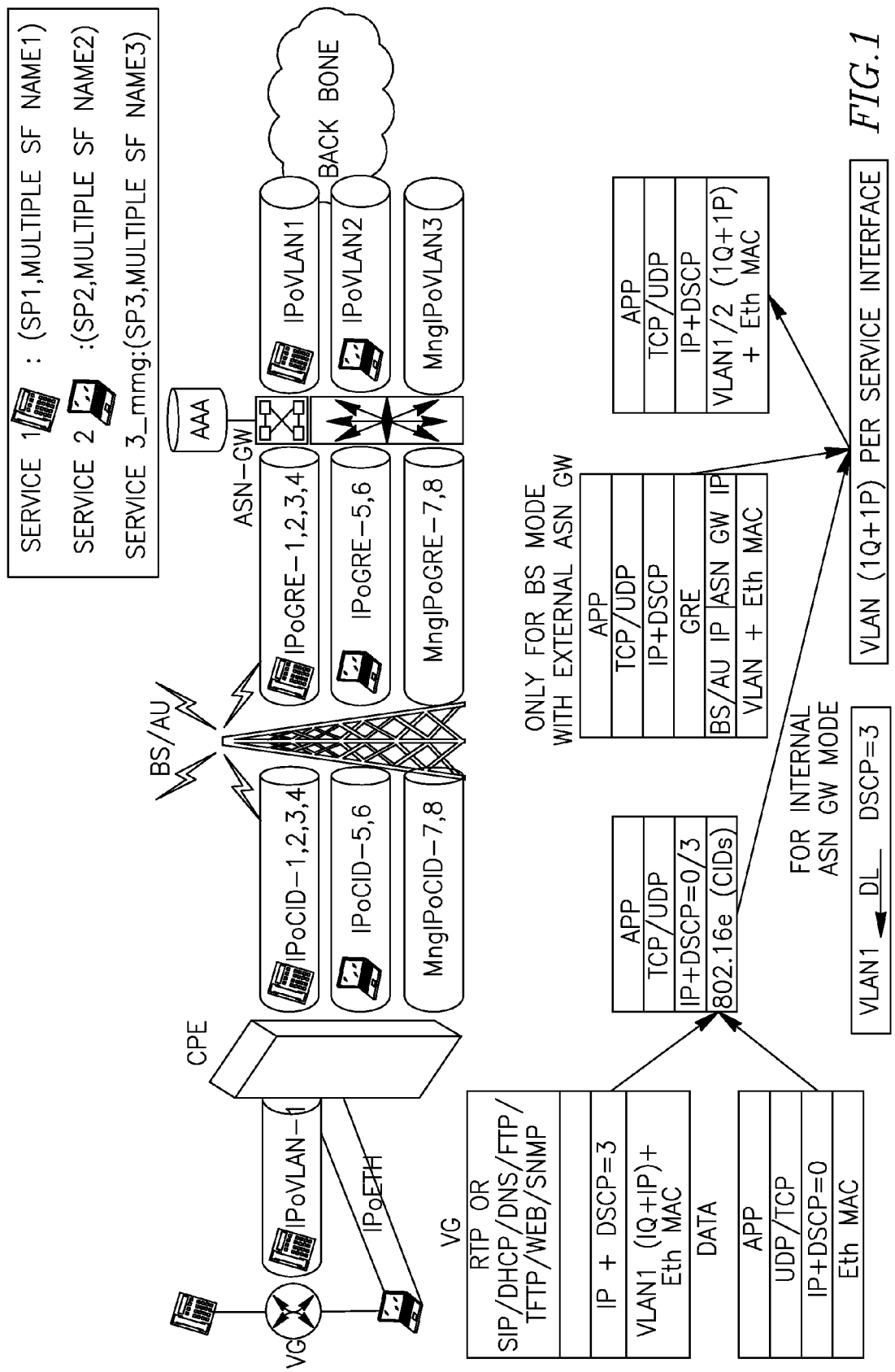
FIG. 1 illustrates an example of network architecture configured in accordance with an embodiment of the invention.

A general overview of an end to end solution in a WiMAX network is illustrated in FIG. 1.

Let us first consider a case where the CPE is used as an IP bridge and provides a selective ARP proxy for other users' devices which belong to the same LAN as that CPE. First, the other users' devices direct packets generated by them to the source MAC address of the CPE. The CPE receives these packets outgoing from the LAN, that are tagged with a VLAN label.

The CPE may then mark these packets with a suitable DSCP value, after having considered the outgoing VLAN tag and the packet's priority. In the alternative, the CPE simply uses the original DSCP value of the packet for classifying the packet into the appropriate WiMax air-link service flow connection. Before sending the packet to the WiMax MAC convergence sub-layer, the CPE's internal application removes the VLAN label and the Ethernet MAC layer from the outgoing packet and forwards the IP packet to the WiMax MAC Convergence sub-layer. The WiMax Convergence sub-layer in return forwards the packet to the relevant service flow by using the packet's DSCP value and then forwards the packet over the link.

Preferably, one may utilize the VLAN interface service of the respective ASN GW to recover the VLAN, for carrying out this method. Then, by taking into account the GRE tunnel key, the outgoing packet is conveyed towards the uplink (UL) direction and forwarded over the backbone northbound interface.

Figure 2A:
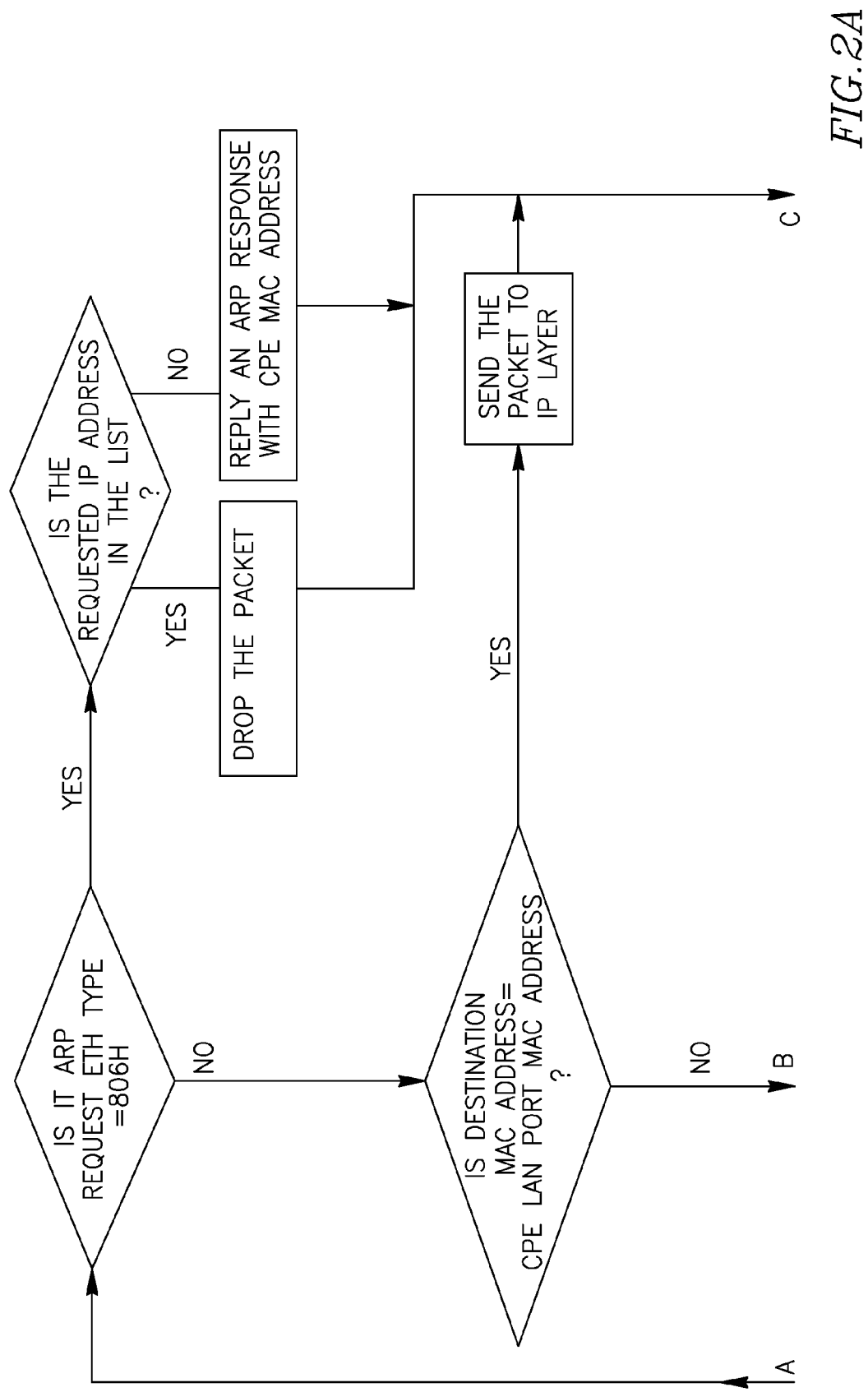
FIGS. 2A and 2B present a flow chart for carrying out an embodiment of the present invention for forwarding packets from a CPE being part of the LAN.
Figure 2B:
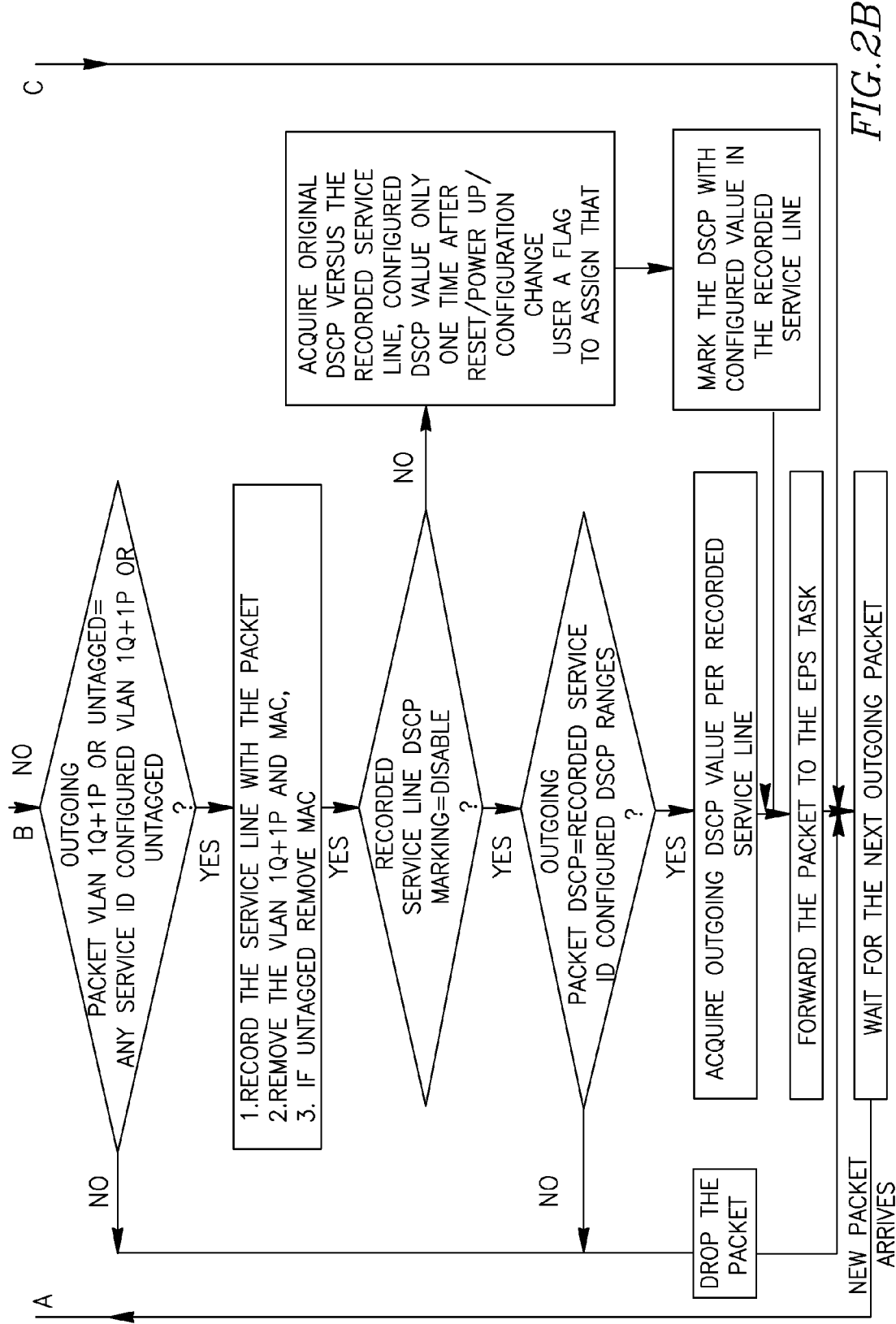

FIG. 2 is a flow chart illustrating this embodiment of the present invention.

In the reverse direction, the ASN GW filtering and classifying capabilities are used in order to direct the incoming packet which is destined to a subscriber device being a part of the LAN, to the correct GRE tunnel. To do so, the VLAN label and the IP Destination are used in a process of finding out the destination CPE. Once the destination CPE has been identified, the VLAN label is stripped off and the packet is forwarded to the relevant GRE tunnel of the CPE associated with the DSCP classifier.

When the incoming packet reaches the CPE, the CPE's application layer compares the DSCP of the arriving packet and associates the appropriate VLAN label to the packet. Then, an ARP process is initiated in order to find out the MAC address of the subscriber device which is the destination for the packet, and this MAC address is then used for the incoming packet as its destination address while forwarding the packet via the LAN to the destination subscriber device.

Figure 3:
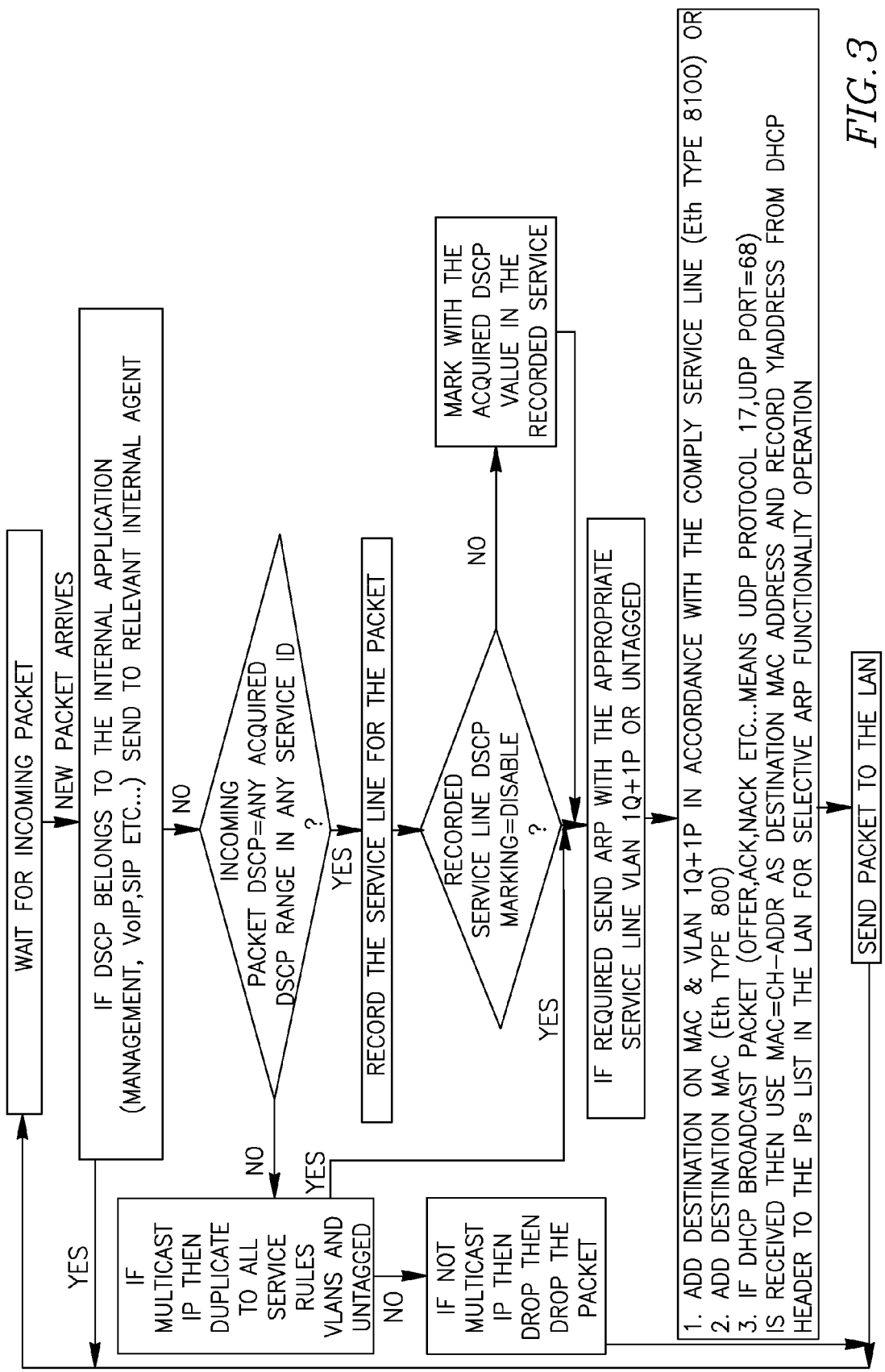
FIG. 3 presents a flow chart for carrying out an embodiment of the present invention for incoming packets to a CPE being a part of the LAN.

FIG. 3 is a flow chart illustrating this embodiment of the present invention.

In a case where the received packet is an IP multicast packet, the receiving CPE would duplicate the packet and would forward these copies of the packet to all known VLANs over the LAN.

The following tables 1 and 2 describe the various steps taken by the CPE from the LAN to the air-link and vice versa, respectively. The following numbers are used merely as examples and as will be appreciated by those skilled in the art, any legal number for DSCP (0-63), VLAN 1Q (0-4095) and 1P (0-7), may be used.

TABLE 1

Outgoing Packets to the air-link

| | LAN input | | | | | WiMax Air-link Output PDU | |
| --- | --- | --- | --- | --- | --- | --- | --- |
| Service ID | VLAN ID Configured | VLAN Priority Configured | DSCP acquired of arriving packet (Not Configured) | DSCP Configured | DSCP Marking | CID # | Transmitted Packet DSCP value |
| 1 | 7 | 2 | 6 | 7-7 | Enable | 4 | 7 |
| 2 | 6 | 1 | 9 | 9-10 | Disable | 5 | 9 |
| 2 | 6 | 1 | 10 | 9-10 | Disable | 5 | 10 |
| 4 | 8 | 4 | 62 | 62-62 | Disable | 6 | 62 |
| 5 | Untagged | Untagged | 11 | 11-11 | Disable | 7 | 11 |
| 6 | Untagged | Untagged | 13 | 13-14 | Disable | 8 | 13 |
| 6 | Untagged | Untagged | 14 | 13-14 | Disable | 9 | 14 |
| 8 | Untagged | Untagged | 18 | 16-16 | Enable | 10 | 16 |

TABLE 2

Incoming Packets from the air-link

| | LAN OUTPUT | | | | | WiMax Air-link Incoming Packet Received Packet DSCP value |
| --- | --- | --- | --- | --- | --- | --- |
| Service ID | VLAN ID Priority of Packet sent to LAN | VLAN Priority of Packet sent to LAN | DSCP value of Packet sent to LAN | DSCP Configured | DSCP Marking | |
| 1 | 7 | 2 | 6 | 7-7 | Enable | 7 |
| 2 | 6 | 1 | 9 | 9-10 | Disable | 9 |
| 2 | 6 | 1 | 10 | 9-10 | Disable | 10 |
| 4 | 8 | 4 | 62 | 62-62 | Disable | 62 |
| 5 | Untagged | Untagged | 11 | 11-11 | Disable | 11 |
| 6 | Untagged | Untagged | 13 | 13-14 | Disable | 13 |
| 6 | Untagged | Untagged | 14 | 13-14 | Disable | 14 |
| 8 | Untagged | Untagged | 18 | 16-16 | Enable | 16 |

As will be appreciated by those skilled in the art, the networking services provided as well as the subscriber terminals (the CPEs) communicate of the present invention are operative along/according to a standard wireless protocol. This protocol may conform with standards such as an OFDM (Orthogonal Frequency Division Multiplexing) protocol, or a cellular protocol, or a WiMax protocol, or a WiFi protocol, or a BlueTooth protocol, or a ZigBee protocol. Additional exemplary protocols include CDMA, GSM, LTE, UMTS and OFDMA. Still it should be understood that other protocols may be used, all without departing from the scope of the present invention.

It is to be understood that the above description only includes some embodiments of the invention and serves for its illustration. Numerous other ways of achieving the same functionality where the CPE is used as an IP bridge and provides a selective ARP proxy for other subscribers belonging to the same LAN as that CPE may be devised by a person skilled in the art without departing from the scope of the invention, and are thus encompassed by the present invention.

The invention claimed is:

1. A method of provisioning services to subscriber devices associated with a local area network (LAN) comprised in a wireless network, comprising:
    receiving, at a first wireless subscriber device within the LAN, via the LAN, an outgoing packet that has been generated by a source subscriber device associated with the LAN, the outgoing packet being tagged with a VLAN label;
    removing the VLAN label from the outgoing packet and providing a DSCP value in the outgoing packet, the DSCP value being established based on the VLAN label, and the priority of the packet;
    forwarding, over the wireless network, said outgoing packet towards a gateway in the VLAN, over a connection established based on the DSCP value;
    at the gateway, providing the VLAN label to the outgoing packet based on the DSCP value; and
    forwarding said outgoing packet with the VLAN label to a destination subscriber device in the VLAN.

2. A method according to claim 1, further comprising a step of forwarding said outgoing packet from said first wireless subscriber device along a GRE tunnel, and recovering information associated with the identification of the VLAN by using a GRE tunnel key.

3. A method of provisioning services to subscriber devices associated with a local area network (LAN) comprised in a wireless network, comprising:
    receiving at a first subscriber device, via the wireless network, an incoming packet that has been generated outside said LAN, the incoming packet comprising a DSCP value;
    associating the DSCP value of said incoming packet with a priority of the packet and a VLAN label;
    tagging the incoming packet with the VLAN label;
    applying Address Resolution Protocol (ARP) procedure to find a MAC address of a second subscriber device associated with said LAN, based upon an IP address of said second subscriber device; and
    forwarding said incoming packet towards the second subscriber device, via the LAN, based on the MAC address.

4. A method according to claim 3, wherein finding the MAC address associated with the second subscriber device is made based on a VLAN label and an IP designation address of the incoming packet.

5. A method according to claim 4, wherein the incoming packet to the second subscriber device is performed over a GRE tunnel with which said second subscriber device is associated.

6. A method according to claim 5, wherein forwarding of the incoming packet to a corresponding GRE tunnel is carried out based upon information retrieved from a DSCP classifier associated with said incoming packet.

* * * * *